June 17, 1969  J. HENRY-BAUDOT  3,450,919

MULTIPLE MEMBER WINDINGS FOR ELECTRICAL ROTATING MACHINES

Filed Aug. 1, 1966  Sheet _1_ of 3

Inventor:
Jacques Henry-Baudot
By Kenyon, Palmer, Stewart
& Estabrook,
Attorneys June 17, 1969  J. HENRY-BAUDOT  3,450,919
MULTIPLE MEMBER WINDINGS FOR ELECTRICAL ROTATING MACHINES
Filed Aug. 1, 1966  Sheet 3 of 3

Inventor:
Jacques Henry-Baudot
By Kenyon, Palmer, Stewart
& Estabrook
Attorneys

United States Patent Office 3,450,919
Patented June 17, 1969

3,450,919
MULTIPLE MEMBER WINDINGS FOR ELECTRICAL ROTATING MACHINES
Jacques Henry-Baudot, Antony, France, assignor to Societe d'Electronique et d'Automatisme, Courbevoie, France
Filed Aug. 1, 1966, Ser. No. 569,330
Claims priority, application France, Sept. 16, 1965, 31,628; July 19, 1966, 69,906
Int. Cl. H02k 3/04
U.S. Cl. 310—268                    13 Claims

ABSTRACT OF THE DISCLOSURE

A multiple member winding for a dynamoelectric machine is disclosed in which each member is identical and includes on opposite sides of an insulating carrier, flat thin half turn conductors which extend from the inner to the outer edges of the member. In each member, a number of uniformly spaced ends of conductors at one edge of the member are left unconnected to the corresponding ends on the other face of the member, said number being equal to $q+1$ where $q$ equals at least 3. This permits stacking of the members with registry between corresponding conductor ends in each layer and interconnecting of the members to form a complete winding regardless of the number of members employed.

---

The present invention concerns improvements in or relating to multiple member windings for electrical rotating machines and to machines embodying same as rotary armatures thereof.

A multiple member winding is a winding the series and closed electrical circuit of which is evenly distributed on a plurality of distinct mechanical carriers which can be mounted as a unitary mechanical unit with part at least of the members so associated as to be enclosed in a single magnetic field airgap or with part at least of the members so spaced as to be individually introduced in separate magnetic field airgaps.

The present invention is more particularly concerned with winding members of the kind wherein two sets of flat and thin half-turn conductors are united to opposite faces of a thin insulating carrier (which carrier may be reduced to a mere layer of bonding and insulating material such as a thermosettable resin), each such "lamellar" conductor extending substantially from one edge to the other edge of such a carrier so that face-to-face connections can be made from set or layer of conductors to the other set or layer in order to define the electrical series circuit of that part of the winding such a member constitutes.

It is an object of the invention to so provide such winding members and the composite multi-member winding resulting from their electrical and mechanical arrangement that all the members are of identical pattern and design and that nevertheless any number of winding members may be associated for constituting a complete winding without any modification of such pattern and design.

According to a feature of the invention, a multiple winding member for an electrical rotary machine wherein each winding member comprises two layers of lamellar half-turn conductors, with the same odd number of half-turn conductors in each and any layer in such members, is mainly characterized in that, in each layer of each member $(q+1)$ uniformly spaced ends of half-turn conductors at one edge of said layer are left unconnected to corresponding ends of half-turn conductors of the other layer in said member, all other ends of half-turn conductors in the layers in said member being connected from layer to layer, said number $q$ being at least equal to 3, in that, said members being mechanically united with such unconnected ends of half-turn conductors in registering positions from member to member, $q$ successive unconnected ends in a layer of a member are connected to $q$ successive unconnected ends in a layer of the next member facing said first named layer, said electrical connections being made with the provision of a shift by one position from the first to the second of said facing layers, said shift being of a definite direction when passing from member to member in the unit, and in that, in the first and last layer in said unit, the $(q-1)$ unconnected ends intermediate between the first and last one in such sets of ends are connected by pairs of same position in said layers, the first unconnected terminal in one of said layers being connected to the last unconnected terminal in the other one of said first and last layers with a shift of reverse direction with respect to the direction of the shift of the connections between the facing layers of members in said unit.

In such a winding, the said number $q$ is defined as being a number which, multiplied by the number $p$ of pairs of poles in the machine to which said winding will be embodied and by an arbitrary number $n$ (so that the number of half-turn conductors in each and any layer is $(p.q.n+1)$, defines the number of connections to be made from member to member in the winding unit. Said unconnected ends will consequently be spaced apart by $(n-1)$ other ends of half-turn conductors in each layer.

This and further features of the invention will be described in detail with references to the accompanying drawings which illustrate a specific illustrative embodiment of the invention for a disc-shaped member winding for an eight pole machine. In said embodiment the value of $q$ is illustratively equal to 6 and the value of $n$ equal to 2, so that, as the value of $p$ is 4, each layer of half-turn conductors is made of 49 half-turn conductors.

Figure 1:
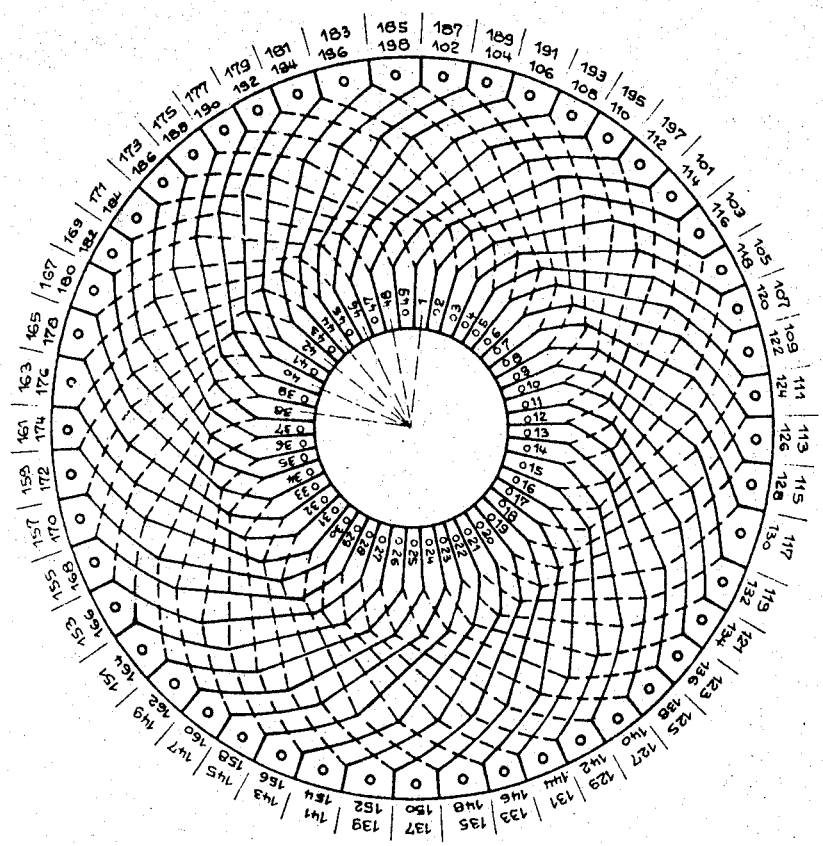
FIG. 1 shows a front view of a winding member.
Figure 6:
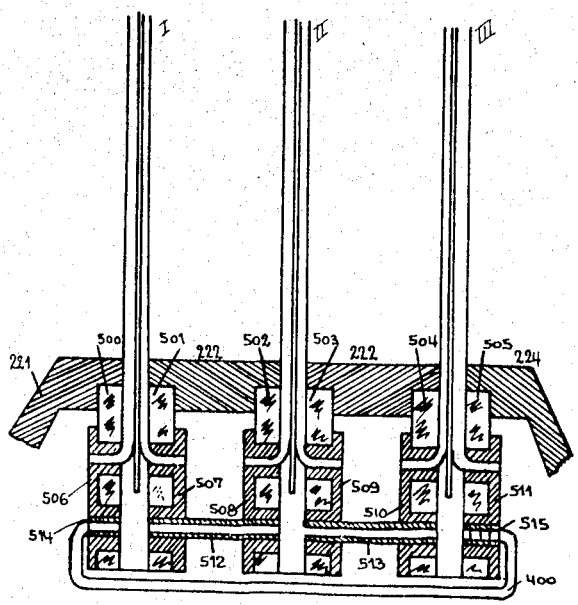
FIG. 6 shows a further embodiment of a winding unit made of three winding members; and, FIG. 7 shows a front view of a contact member associated to a winding member in the embodiment of FIG. 6.

In the winding member of FIG. 1, the half-turn conductors of the annular member (similar application of the invention could be made with cylindrical winding members) are printed on the surface of a thin insulating annular carrier in close juxtaposition relation and the face-to-face end connections are assumed to be made from the well known plated hole technique. Of course, the invention also directly and plainly applies to half-turn conductors the ends of which outpass the intermediary insulator by extension tabs which can be brazed or soldered for such face-to-face connections. FIG. 6 shows such a kind of conductors' ends.

In order to simplify the description, the front face conductors of the winding member which are shown in full black line will be said "forward" conductors whereas the rear face conductors, which are partly shown in dot lines, will be named "backward" conductors, these names intending to define that a front half-turn conductor starts from the edge of the member, the inner edge in the illustrated embodiment, at which certain conductor ends will be left unconnected in the member, and that a rear half-turn conductor goes back to said edge being serially connected to the corresponding front face conductor at the other edge of the member.

The end terminals of the half-turn conductors at the inner edge of the member are numbered from 1 to 49. The terminal 1 is part of the front face half-turn conductor 101 which is connected, at the outer edge to rear face conductor 114; the terminal 2 is connected to the front face conductor 103 which, by its other edge end, is connected to the rear face conductor 116; and so forth in the clockwise direction, the front face conductors being numbered in odd numbers and the rear face conductors being numbered in even numbers from 101 and 102 respectively. It may be noticed that all outer edges of conductors are shown with face-to-face connections, whereas, as it will be later explained, a connection is useless between the front face conductor 175 and the rear face conductor 188.

The inner end terminals on the other hand are not all provided with face-to-face connections. In FIG. 1, the unconnected terminals are numbered 1, 38, 40, 42, 44, 46 and 48. Consequently as said, there are $(q+1)=7$ unconnected terminals at said inner edge, the six ones of the series starting from 38 and ending at 48, plus the terminal 1, and said unconnected terminals are spaced apart by $(n-1)=1$ terminal. The electrical series-wave circuit of the winding member, instead of being closed as usual, is consequently interrupted at seven points. Starting from instance from the end terminal 1, the circuit passes, in the clockwise direction, along the half-turn conductors 101–114–125–138–149–162–173–186–197–112–123–136–147–160–171–184 and ends at the rear inner terminal 48; starting again from the front terminal 48, the circuit passes along the conductors 195–110–121–134–145–158–169–182–193–108–119–132–143–156–147–180 and ends at the rear end terminal 46; starting from the front terminal 46, the circuit passes along the conductors 191–106–117–130–141–154–165–178–189–104–115–128–139–152–163 – 176 and ends at the rear face terminal 44; starting from the front face terminal 44, the circuit passes along the conductors 187 – 102–113–126–137–150–161–174–185–198–111–124–135–148–159–172 and ends at the rear face terminal 42; starting from the front face terminal, the circuit passes along the conductors 183–196–109–122–133 – 146–157–170–181–194–107–120–131–144–155–168 and ends at the rear terminal 40; finally starting from the front face terminal 40, the circuit passes along the conductors 179–192–105–118–129–142–153–166–177–190–103–116–127–140–151–164 and ends at the rear face terminal 38. It must be noticed that the half-turn conductors 175 and 188 are not part of such circuits and consequently constitute "dead" section conductors which is conventional in series-wave windings. Consequently, the outer end connection may be omitted between such half-turn conductors.

Figure 2:
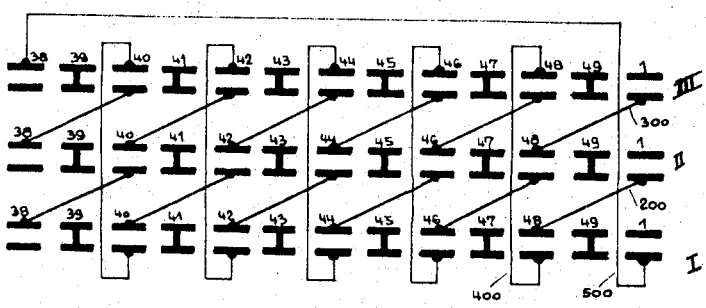
FIG. 2 shows a diagram of connections for a winding made of three winding members (as it will be shown, said number $m=3$ of members is arbitrary and can be varied at will)

Any wanted number of such winding members may be united and interconnected, said members being parallelarly arranged with their terminals of same numbering in registration from member to member, such as for instance shown in FIG. 2 for a winding comprising three members in a partial linear development of a corresponding portion of the inner edge of the member of FIG. 1. In FIG. 2, for each member the face-to-face end terminals from 38 to 1 are shown, with inner connections in the members I, II and III for the terminals 39, 41, 43, 45, 47 and 49. The rear terminals of the backward conductors from 38, 40, 42, 44, 46 and 48 in the winding member I are connected by such connections as shown at 200 to the front face terminals of the forward conductors 40, 42, 44, 46, 48 and 1 of the winding member II. Similarly the rear face terminals 38, 40, 42, 44, 46 and 48 are connected by such connections as 300, to the front face terminals 40, 42, 44, 46, 48 and 1 of the winding member III. The rear face terminals 40, 42, 44, 46 and 48 of the winding member III are connected back to the corresponding front face terminals of the winding member I by retro-connections such as 400 and a further retro-connection 500 is provided from the rear face terminal 38 of III to the front face terminal 1 of I.

Referring to the electrical circuit defined with respect to FIG. 1, it may be seen that, after the first portion of this circuit on the winding member I, starting as said from the front face terminal 1 and ending at the rear face terminal 48, a connection 200 reaches the front face terminal 1 of the winding member II and the circuit follows the corresponding first portion of the winding member II ending at the rear face terminal 48 from which a connection 300 reaches the front face terminal 1 of the winding member III for a portion of circuit ending at the rear face terminal 48. Consequently three identical and identically positioned sections of the circuit have been traced on the three winding members. The series circuit now passes from the rear face terminal 48 of the winding member III to the front face terminal 48 of the winding member I through the retro-connection 400 and a second portion of the circuit is followed in said member I up to the rear face terminal 46, from which through a connection 200, the same portion of circuit is serially followed on the member II up to the rear face terminal 46 of said member II, from which a connection 300 reaches the front face terminal 48 of the member III whereby the circuit passes through the corresponding portion of the member III up to the rear terminal 46 thereof, and so forth. Finally the series circuit closes through the connection 500 between the rear face terminal 38 of the member III and the front face terminal 1 of the member I. Each three portions of the series circuit being aligned from member to member, it is clear that, when the winding is introduced within a magnetic field, its electromagnetic efficiency will be thrice the efficiency of a single member if this latter would be of a closed electrical pattern, as the number of conductors is multiplied by three.

It is apparent that any other member than three winding members can be associated without any departure of the above described connections. For instance, the member II may be omitted or, on the other hand and preferably, other identical winding members may be inserted between the members II and III for instance with similar connections as 200 and 300. It is also clear that any change in the number $q$ may be made without departing from the general principle of member pattern and interconnection as described since it will only modify the numbers of such connections as 200, 300, 400. . . . Quite obviously, the number $n$ which solely concerns the number of turns may be varied without affecting the invention.

Figure 3:
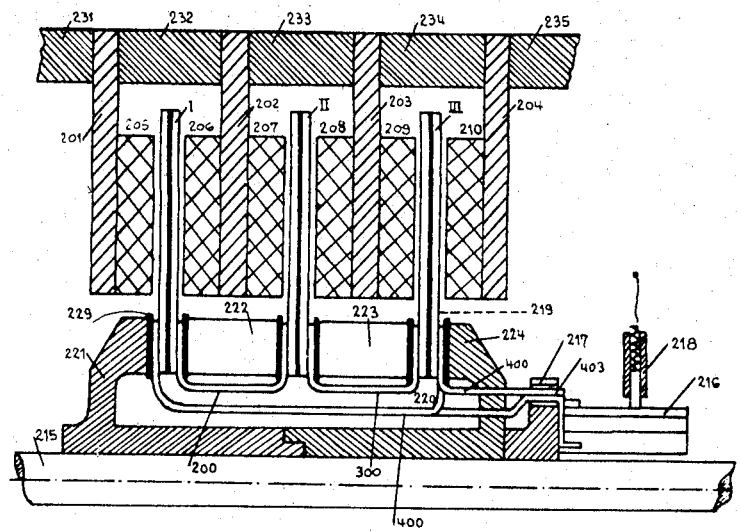
FIG. 3 shows how such three members may be made as a winding unit armature in an electrical rotating machine.
Figure 5:
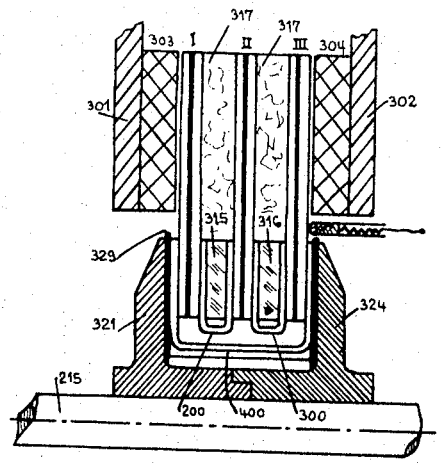
FIG. 5 shows how such three members may be made as a winding armature unit of a different kind in an electrical rotating machine having a single magnetic airgap.

The winding members may be united either with such spacings therebetween that they can be placed within separate magnetic airgaps, FIG. 3, or else they can be placed within a single magnetic airgap, FIG. 5.

Figure 4:
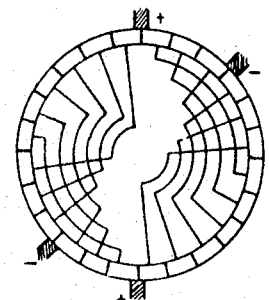
FIG. 4 shows a front view of a commutator which may be associated to such a unit.

Referring first to FIG. 3, a shaft 215 is first provided with an assembling member 221 a portion of which constitutes a sleeve secured to said shaft and another portion of which constitutes a ring having a planar face perpendicular to the axis of the shaft. The winding member I to which flexible conductor portions have been soldered or otherwise secured to the unconnected inner end conductor terminals is applied onto said face by its forward half-turn conductor side and a spacer ring 222 is placed on the free side of said member. Insulating washers such as 229 are interposed between the sides of said member I and said assembling members 221 and 222. Then the winding member II provided with flexible conductor portions soldered or otherwise secured to its backward half-turn conductor side is applied on the ring 222 after those conductor portions from member I constituting the connections 200 have been secured or otherwise soldered to its forward conductor unconnected ends and a spacer ring 223 applied over its backward conductor face; here again, insulating washers such as 229 are interposed between the rings 222 and 223 and said member II. Then the winding member III is placed over the exposed face of 223, after being provided with flexible conductor portions soldered or otherwise secured to its unconnected backward conductor ends and the ends of the flexible conductor portions from the backward conductor face from the member II connected to the unconnected forward conductor end terminals of its forward conductor face. A final assembling member 224 is applied over the exposed face of said member III, after one flexible conductor portion from the forward conductor face of member I, starting from the end terminal 1 thereof, has been electrically connected to the corresponding end terminal 38 of the backward face of said member III. Of course, insulating washers are also used for mounting said member III. Up to this step, consequently, all such connections as 200, 300 and 500 have been made. The flexible conductor portions from the forward conductor face of member I and the backward conductor face of member III are drawn through an opening in the member 224, as being the connections numbered 400 in FIG. 2, and the bared ends of such conductor portions are electrically connected when passing through an opening of an additional sleeve part 217 applied over the member 224 around the shaft 215 and supportnig a commutator 216 of cylindrical shape. A portion of 224 constitutes a sleeve abutting with the sleeve making part of the member 221 and the sleeve 217 is a part of an additional mounting member which is provided with a sleeve portion abutting on the shaft with the member 224. At 403, the pairs of portions of the conductors 400 are distributed, simultaneously to their electrical connections, to the segments of the commutator 216. Brushes such as 218 bear on said commutator blades, for instance four brushes are provided on a commutator such as shown in cross-sectional view in FIG. 4 and having twenty-four segments or blades, relatively interconnected as shown for a normal switching when the commutator rotates with the shaft under the brushes. For instance, the six conductor ends from the connections 400 are electrically connected to six consecutive segments on said commutator.

The winding member I in the complete machine is located within a magnetic airgap which is for instance defined by two magnetc ferrite rings such as 205 and 206 respectively carried over two annular yoke plates 201 and 202. The winding members II and III are similarly located within magnetic airgaps defined by pairs of ferrite rings 207–208 and 209–210. The ferrite ring 207 is supported by the yoke plate 202, the ferrite rings 208 and 209, by the yoke plate 203 and the ferrite ring 210, by the yoke plate 204. Said soft magnetic yokes are secured to and spaced apart by annular spacers such as shown at 231, 232, 233, 234 and 235. The other components of the machine are not shown as useless for the explanation of the invention. It must be understood that each ferrite ring is provided with magnetic permanent poles of alternate North and South names around it, which poles are permanently "printed" on their airgap faces by any suitable magnetization known process, and that said poles are of opposite names from the facing faces of 205 and 206, from 207 and 208, and from 209 and 210. In the concerned example, with a winding pattern such as shown in FIG. 1, eight poles are distributed around each ferrite ring. The field structure may be provided in two half-shells for being placed around and over the armature unit, according to a previously known arrangement. Of course, if desired, separate magnets may be substituted to said ferrite pole rings, said magnets being secured by any known means to the above-described yoke plates.

Another possible arrangement of a multi-member unit is shown in FIG. 5. The three winding members are merely assembled with interopsed insulating washers 315 and 316 and clamped between member 321 and 324 similar to the previously described members 221 and 224 of FIG. 3 with the interposition of insulating washer such as 329. When required, the unit may be moulded in a block by means of a thermosettable resin as shown at 317 in the drawing. The thus made unit is placed within a single magnetic airgap formed by pole rings 303 and 304 secured to magnetic yokes 301 and 302. The material 317 may enclose magnetic particles if desired. The moulding may be made after all electrical connections have been made and the assembly operation with the shaft merely consists of clamping the moulded unit between the members 321 and 324. Instead of a separate commutator as in the embodiment of FIG. 3, there is shown in FIG. 5 that the brushes such as shown can be directly applied over an end face of a winding member, the last one for instance. Of course, such a commutation arrangement may be provided when the winding members are spaced apart for location within separate magnetic airgap. In such a case, the half-turn conductors constitute the commutator segments or blades in an already known fashion.

Figure 7:
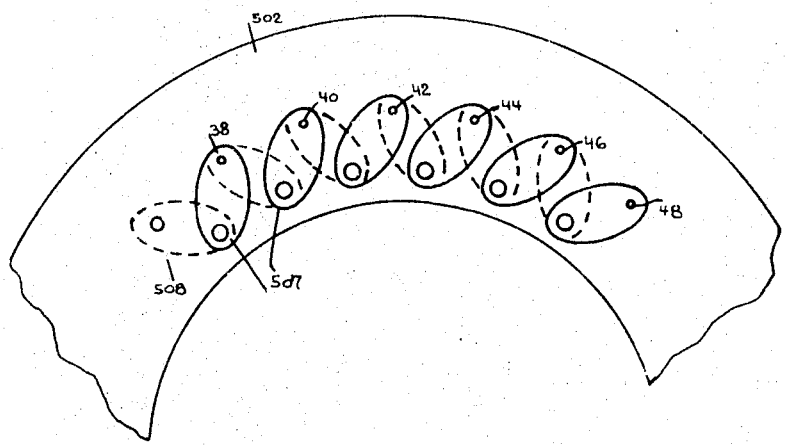

FIG. 6 shows an alternative embodiment of a winding unit according to the invention, and more particularly, to the exception of an omitted commutator, of a winding unit derived from the one disclosed in FIG. 3. The inner edge of each winding member is provided with insulating rings each provided with a set of metallic inserts such as shown in full line in the partial view of FIG. 7. Each insert is provided with an upper metallized or plated hole in which is introduced and soldered one of the unconnected half-turn conductor ends, as shown (such ends being assumed to be separated from the intermediate insulating layer of the winding member). Each insert is further provided at its lower end with another plated hole for insertion and electrical connection of conductive ends of connection conductors such as 200, 300, 400, 500. Said inserts are obliquely applied to the insulator ring surface so that the lower holes thereof are in registration from face to face of the members and from member to member in the unit with a shift with respect to their upper holes equal to one-half of the span between two successive unconnected ends of half-turn conductors in the winding layers. The inclination or slant of said inserts is reversed from face to face of a winding member as indicated in dot lines in FIG. 7 for the ring 501, carrying inserts 507 and the facing ring 502 carrying the inserts 508, in the unit.

To the winding member I are associated the rings 500 and 501, to the winding member II are associated the rings 502 and 503, to the winding member III are associated the rings 504 and 505. Ring 500 carries the inserts 506, ring 501, the inserts 507, ring 502, the inserts 508, ring 503, the inserts 509, ring 504, the inserts 510 and ring 505, the inserts 511.

Each insert may be made of a metallisation over the insulator or within a depression in said insulator obtained together with the plating of the holes from any well-known insulator material plating technique used in the printed circuitry art, but of course, any other technique may be used, as for instance moulding rigid inserts in an insulating mouldable material.

The mounting of the winding unit may be made as follows: the end and spacing members 221 to 224 are machined for adaptation to the winding members carrying their respective pair of insert-carrying rings. Each winding member is provided with such a pair of rings with the unconnected ends of half-turn conductors electrically and mechanically connected to the upper holes of the concerned inserts. In the inserts 506 are plugged and soldered or otherwise secured bare conductor ends 516 of flexible conductors 400 (plus conductor 500, not shown). The winding member I is applied against member 221 and in the lower holes of the inserts 507 are placed hollow stubs of a conductive material, each stub presenting longitudinally extending slots and being slightly resilient; the spacer ring 222 is applied over the exposed face of the winding member I and the winding member II is applied over the exposed face of said spacer 222, thus receiving the ends of the connecting stubs 512 in the lower holes of its associated inserts 508 as the positioning is such that the lower holes of the inserts 507 and 508 are facing each other. Consequently the connections 200 are made with the requested one-unit shift between the unconnected ends of the backward conductors in the winding member I and the unconnected ends of the forward conductors in the winding member II. The same operation is repeated for placing the spacer 223 and the winding member III, whereby the connections such as 300 in FIG. 2 are obtained by means of the conductive connecting stubs 513. Thereafter the other ends of the conductors 400 (and 500) are introduced in the lower holes of the inserts 511 as shown in FIG. 6 at 515, thus completing the electrical circuit of the composite winding. The end member 224 is then applied over the exposed face of the winding member III and the winding unit is consequently completed.

What is claimed is:

1. A winding for an electrical rotating machine comprising a plurality of identical winding members each comprising two layers of lamellar conductors constituting half-turn conductors of a series-wave pattern circuit in odd number in each layer, wherein in each layer of each winding member, $(q+1)$ half-turn ends of uniform spacing are, at one edge of the layer, left unconnected whereas all the other half-turn conductor ends at the same edge as well as at the other edge of the layer are connected to the registering ends of the half-turn conductors of the other layer in the winding member, said number $q$ being at least equal to 3, wherein said winding members are associated with such unconnected half-turn conductor ends in registration from member to member and in the facing layers of the successive members in said association, $q$ successive of said unconnected ends are interconnected with a relative shift by one unit, and wherein in the end layers in the association, the $(q-1)$ unconnected ends intermediate between the first and last ones of such ends are respectively interconnected in registration of positions from one of said layer to the other one, the first end in one of said layer being connected to the last one of the other one of said layer with a direction of shift reverse with respect to the direction of the shift of the connections from intermediate layers of different winding members.

2. A winding according to claim 1 wherein the number of half-turn conductors in each layer is equal to the product plus one of the number $q$, the number of pairs of poles in the machine to which the winding is to be embodied, and an arbitrary number $n$ and wherein the said uniform spacing is made equal to $(n-1)$.

3. A winding according to claim 1 wherein the winding members are united in a single block for introduction within a single magnetic field airgap.

4. A winding according to claim 1 wherein the winding members are united with a relative spacing for introduction of each of said winding member within a separate magnetic airgap of a machine.

5. A winding according to claim 1, wherein each winding member is associated at its edge where such unconnected conductor ends are provided to a pair of oppositely arranged connector members, each connector member comprising $q$ conductive elongated elements extending from a position whereat they are connected to $q$ unconnected ends of the layer to which it is applied to a second position outpassing said edge of the winding member and shifted by one-half of the spacing between unconnected conductor ends with respect to the first mentioned position so that in each pair of connector members the said second positions are registering whereas said first mentioned positions are spaced apart by a shift equal to the spacing of two successive unconnected conductor ends of the registering ends in the two layers of a winding member, and wherein the member to member interconnections are made by connecting the second named positions by pairs from member to member.

6. A winding according to claim 5, wherein said connector elements are metallizations of an insulating carrier with plated-through holes at said first and second positions of said metallizations.

7. A winding according to claim 1, wherein a separate commutator member, having a number of segments which is a multiple of $q$, is associated to the said winding members a number $q$ of uniformly spaced segments of said commutator being respectively connected to the $q$ connections from the last to the first winding member of the winding unit.

8. A winding according to claim 7, wherein said connections to said commutator segments are made from two connections in parallel relation respectively from the said last and the said first winding member layers.

9. A winding according to claim 1, wherein the half-turn conductors of one of the end layers in the unit constitute the segments of commutation in the machine.

10. In or for an electric rotating machine, the combination of a multi-layer multiple member winding, wherein each winding member comprises two layers of half-turn conductors substantially extending from edge to edge of said member with, at one edge thereof, a number $(q+1)$ of conductor ends in both layers left unconnected whereas all other conductor ends at both edges are interconnected by registering pairs from layer to layer, said number $q$ being at least equal to 3, and wherein said unconnected ends in said winding members are selectively interconnected in the succession of winding members in the winding for constituting a single series-wave winding closing from the last to the first layers in the assembly, and repeatedly passing $q$ times from said last to said first layers, and of a commutator member having a number of commutation segments multiple of said number $q$ and having a number $q$ of successive segments thereof connected to the $q$ connections from the last to the first layers of said winding, and a rotatable shaft to which such winding and such commutator are secured.

11. In or for an electric rotating machine, the combination of a multiple member winding wherein each winding member comprises two layers of half-turn conductors substantially extending each from edge to edge of said member with, at one edge thereof, a number $(q+1)$ of conductor ends in both layers left unconnected whereas all other conductor ends at both edges are respectively connected in registering pairs from layer to layer, said number $q$ being at least equal to 3, and wherein said winding members are selectively interconnected from $q$ electrical connections from member to member and back from the last to the first layer in the winding, for constituting a single and closed series-wave winding, and a rotatable shaft to which such a winding is secured.

12. The combination of a winding according to claim 3, a rotatable shaft to which said winding is secured, current transducing means associated to said winding and a multipolar magnetic field structure encasing said winding within its magnetic field airgap.

13. The combination of a winding according to claim 4, a rotatable shaft to which said winding is secured, current translating means associated to said winding and as many multipolar magnetic field structures as are winding members spaced in said winding and each enclosing a winding member within its magnetic field airgap.

References Cited

UNITED STATES PATENTS 3,169,204  2/1965  Moressee  310—286

FOREIGN PATENTS 1,029,798  5/1966  Great Britain.

LEE T. HIX, *Primary Examiner.*

D. HARNISH, *Assistant Examiner.*